March 14, 1933.  W. H. STINE  1,901,199
PISTON AND RING THEREFOR
Filed Dec. 11, 1931
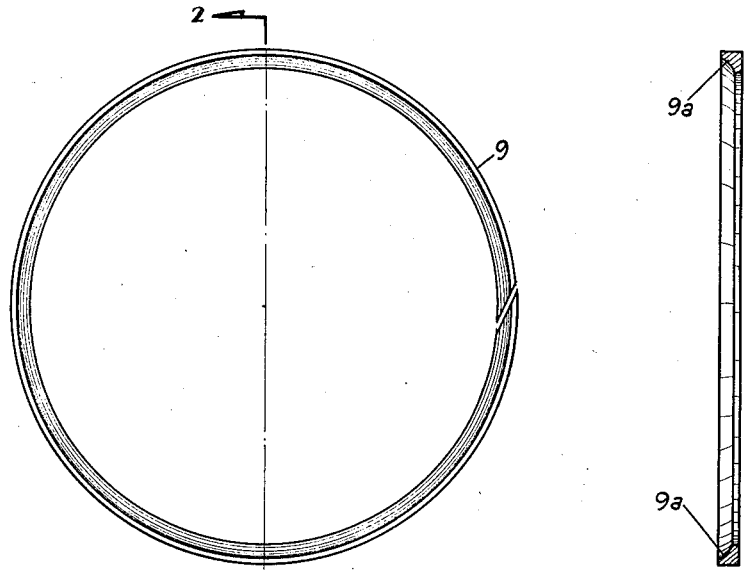
FIG. 1
FIG. 2
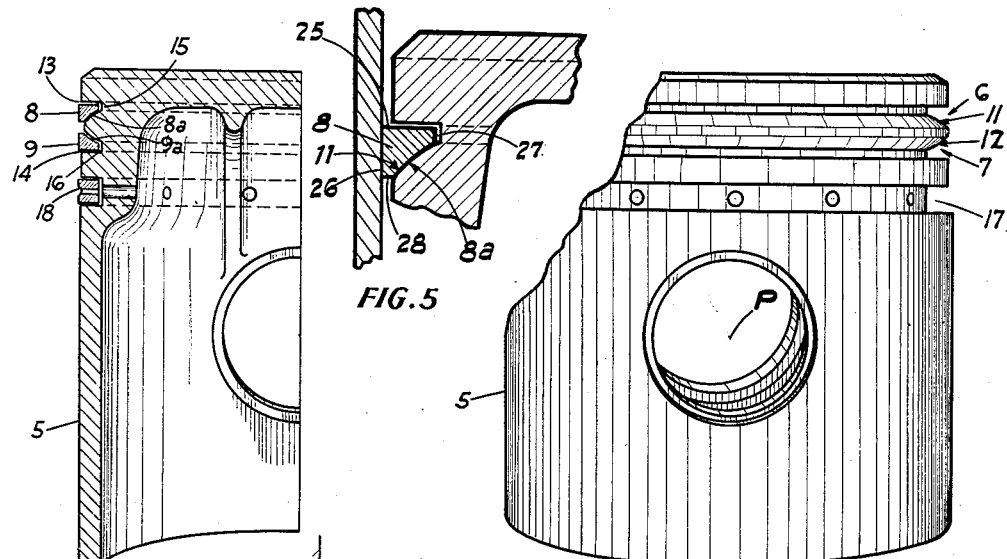
FIG. 3
FIG. 5
FIG. 4
FIG. 6
INVENTOR.
WALTER H. STINE
BY
ATTORNEY.

Patented Mar. 14, 1933

1,901,199

UNITED STATES PATENT OFFICE

WALTER H. STINE, OF LOS ANGELES, CALIFORNIA, ASSIGNOR OF ONE-HALF TO LYMAN M. KING, JR., OF LOS ANGELES, CALIFORNIA

PISTON AND RING THEREFOR

Application filed December 11, 1931. Serial No. 580,339.

This invention relates to a piston and piston ring construction.

An object of the invention is to provide a piston and piston ring construction therefor which will maintain within the piston cylinder a more uniform working fit at all portions of the stroke than has heretofore been possible.

In the present standard ring and standard piston construction the compression of the gas does not exert its entire force upon the head of the piston due to the leakage past the piston rings.

By this invention a perfect seat upon the piston and perfect alinement of the abutting face of the piston ring with the face of the cylinder wall is maintained.

Another object of the invention is to provide a ring which fits more loosely in the piston groove and in such a manner that there is less liability of the rings sticking in the grooves than is apt to be encountered in the present standard equipment.

A still further object of the invention is to provide a device which tends to eliminate out-of-round wear and tapered wear on the cylinder wall. This improvement is due to the fact that this newly invented ring at all times abuts squarely against the piston wall.

Yet another object of the invention is to provide an improved mounting for a piston ring wherein the piston has an annular face which is curved transversely of the annulus, and a piston ring having a cooperating seating face which is shaped in such a manner as to enable it to perform its functions more perfectly.

Other objects, advantages and features of the invention may hereinafter appear.

In the accompanying drawing,—

Fig. 1 is a plan view of the improved ring.

Fig. 2 is a mid-sectional view on line 2—2 of Fig. 1.

Fig. 3 is a quarter section of the piston and its rings in the assembled position.

Fig. 4 is a side elevation of the piston provided for use in conjunction with the piston rings.

Fig. 5 is an enlarged fragmentary view showing the piston ring and piston in cross section.

Fig. 6 is a schematic view showing the relation of the external face of the piston ring to the cylinder wall when the piston is tilted and also the relation of the annular concave seat of the piston ring to the cooperating annular convex wall of the piston.

Referring in detail to the drawing, the piston 5 is provided near its working face with a plurality of novel piston ring seats 6 and 7 extending therearound into which respectively seat the piston rings 8 and 9. Said rings 8 and 9 are preferably identical in construction but are reversely arranged as shown in Fig. 3.

Each of said rings is of a generally triangular cross section, the external angle of each ring being substantially a right angle, the side which occupies the hypotenuse of the ring as seen in section being provided with a face 8a or 9a which is concaved toward the body of the ring. Said concave face 8a seats upon an annular convex face 11 provided therefor around the piston 5, and a like seating face 12 is provided for the concave face 9a of the other ring. Each of the seats 11 and 12 forms an annular convexity which extends completely around the piston.

When the piston rings are in the assembled position as shown in Fig. 3 it will be noted that there is a clearance 13 provided between the upper side of the piston ring 8 and the piston, and that a clearance 14 is provided between the lower face of the piston ring 9 and the piston, and there is also an annular clearance 15 between the inner portion of the piston ring 8 and the piston, and a like annular clearance 16 between the inner face of the piston ring 9 and the piston. These clearances provide for maintaining a perfect abutment or working fit of the external faces of the rings 8 and 9 with the cylinder wall when the piston is tilted slightly by reason of the explosion in the combustion chamber. By virtue of the convex seats of the piston cooperating with the concave seats of the rings each ring is maintained in a true longitudinal alinement with the cylinder wall, and the cooperating concave and convex seating faces are in registry at all times whenever the piston is oscillated or tilted by the explosion of the combination charge as aforesaid. By the employment of this positive mechanical action the necessity of the precision fit hitherto used is eliminated. As a result more power coupled with greater security is secured.

When the piston tilts, the ring still forms a fluid-tight fit due to its curvilinear seating surface. The usual annular ring seating recess 17 is provided for the reception of a standard oil ring 18.

It will be observed from Fig. 4 that the convexity 11 is directed away from the center of the axis P of the piston gudgeon (not shown) in order that the rocking or tilting of the piston may not interfere with the maintenance of a fluid tight fit between the piston rings and the piston cylinder. It will further be observed that the oppositely disposed convex seats 11 and 12 are complementary to each other.

In Fig. 5 the piston ring 8 is shown in section on a larger scale, the radius curve of the face 8a thereof and the convex seat 11 against which it abuts both being struck from the point P coincident with the axis of the piston gudgeon. In this view it is clearly seen that the piston ring when viewed in cross section comprises a geometrical figure consisting of two main equal straight legs or sides 25 and 26 which join each other at a right angle, and two other shorter legs or sides 27 and 28 which are respectively perpendicular to the sides 25 and 26, said sides 2 and 28 being connected by the arc 8a, the convexity of said arc being directed toward the aforementioned right angle. This construction is preferable, but the lengths of the legs 27 and 28 may be varied to suit the location of the centers of the radii from which the different arcs are struck.

In Fig. 6 the piston 5 is shown tilted thus causing the ring seating face 12 to recede from the ring face 9a of the lower ring, while the upper piston face 11 is in contact with the ring face 8a.

I claim:

1. A piston provided with an annular convexity which extends therearound, said convexity forming two oppositely disposed piston ring seats and piston rings provided with concave seating faces adapted to ride upon said convexity, there being clearances provided adjacent to said seats to maintain a perfect abutment of the external faces of said piston rings within the piston cylinder during the operation of said piston.

2. A piston having two oppositely directed annular convex seating surfaces and two piston rings having oppositely disposed concaved seating surfaces with which said convex seating surfaces cooperate.

3. A piston provided with an annular recess which extends circumferentially therearound, one of the side walls of said recess being perpendicular to the base of said recess and the other side wall of said recess being curved with relation thereto, each of the side walls of said recess forming a piston ring seat, and a piston ring mounted upon each of said seats and having a bearing surface conforming thereto.

4. A piston provided with an annular recess which extends circumferentially therearound, one of the side walls of said recess being perpendicular to the base of said recess and the other side wall of said recess being curved with relation thereto, each of the side walls of said recess forming a piston ring seat, and a piston ring mounted upon each of said seats and having a bearing surface conforming thereto, there being a clearance to permit said rings to move slightly in a transverse manner with relation to their aforesaid seats to accommodate themselves to the slight tiltings of the piston during the operation of the engine.

5. In combination, a piston having an annular piston ring groove, one of the side walls of said groove being perpendicular to the base of said groove and the other side wall of said groove being curved with relation thereto, and a ring positioned in said groove and having an annular concave face extending the entire periphery of said ring which rides upon a cooperating annular convex wall of the groove in said piston.

6. In combination, a piston ring having an annular concaved wall and a piston having a cooperating annular convexed wall upon which the annular concaved wall of said ring seats, the radii of said concavity and said convexity being struck from the pivotal axis of said piston, said piston ring being thereby adapted to have its full external face abut the piston cylinder wall when the position of said piston becomes tilted.

7. A piston having a convex seating surface and a piston ring having a concave seating surface with which said convex seating surface cooperates.

8. A piston having an external annular convexity and a piston ring provided with a concave seating face adapted to ride upon said convexity, there being a clearance to permit said ring to move slightly in a transverse manner with relation to its seat to accommodate itself to slight tiltings of the piston during its stroke.

9. A piston ring having an annular inwardly directed concave face, the radius of the concavity of said face being equal to the radius of the curvature of the arch of the piston upon which it is seated and being struck from the pivotal axis of said piston.

WALTER H. STINE.